United States Patent Office 3,470,803
Patented Oct. 7, 1969

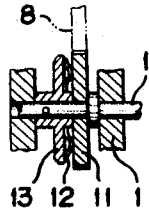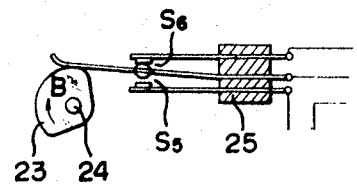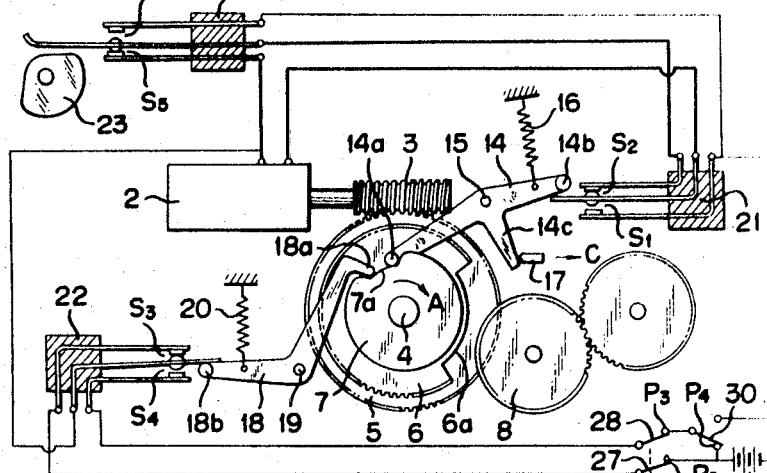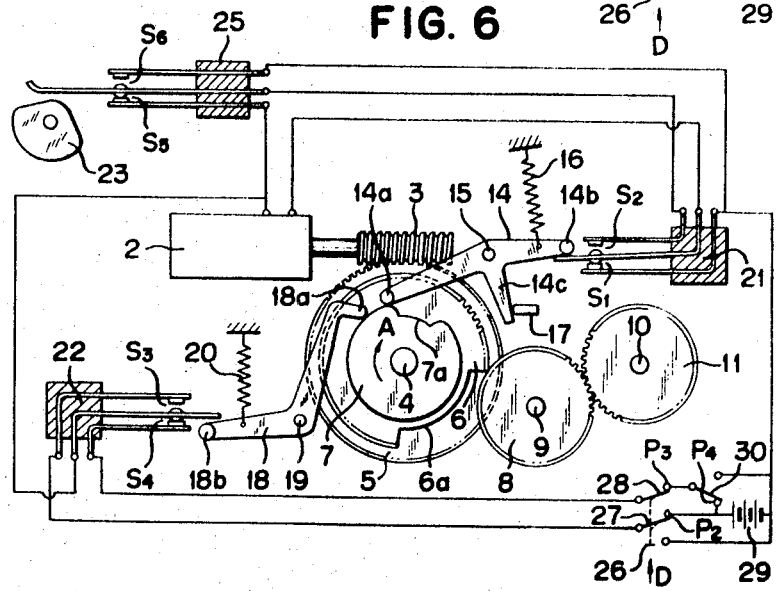

3,470,803
ELECTRICALLY DRIVEN AUTOMATIC WINDING MEANS
Shigetada Fukuoka, Tokyo, and Shuji Kimura, Yokohama-shi, Japan, assignors to Nippon Kogaku K.K., Chuo-ku, Tokyo, Japan, a corporation of Japan
Filed Jan. 27, 1967, Ser. No. 612,149
Int. Cl. G03b 19/04
U.S. Cl. 95—31                                    1 Claim

ABSTRACT OF THE DISCLOSURE

An electrically driven automatic winding means is provided for a camera useful in high-speed, sequence photography which can be set for individual exposures. The film winding, shutter charging and shutter release operations are controlled by sequence cams and a mutilated gear driven by a small electric motor. By means of cam followers for the cams, a plurality of motor control switches are actuated concurrently and sequentially to control the operation of the motor, Dynamic braking circuits are completed by the control switches to prevent overrunning of the motor, particularly at the moment of shutter release, and more particularly when a slow shutter speed setting is used.

---

This invention relates to an electrically driven automatic winding means of cameras.

In an electrically driven camera, in order to increase the efficiency in high speed, sequence photography, it is necessary to carry out the film winding and shutter set operation within a short time, and at the same time it is necessary to reduce the time loss between the respective operations due to the mechanical structure. In addition to that, there must be an assurance that film winding operation and shutter setting operation should not be carried out during the exposure, i.e. during the operation of shutter or mirror.

Generally speaking, in case the operations such as film winding or the like are carried out within a sort time, the inertia of the rotating body becomes greater because of the high speed rotation. It is insufficient to open the motor circuit because the rotating body will continue or overshoot to the next phase due to inertia, and will not stop at a predetermined position. There is the possibility that the circuit of motor is closed again, and therefore it is necessary to operate a brake by any means in order to stop the rotating body at the predetermined position.

The devices of this kind, in most cases, are mounted into a camera later on, rather than built into a camera from the beginning and therefore it is desirable that the device should be small and in a compact form. The conventional devices are not sufficiently satisfactory in view of the size of the motor cam, the intermittent transmitting device, the electric source device or the positions for installing the same.

It is an object of the present invention to provide an electrically driven automatic winding means of compact structure and arrangement to fit within a camera casing wherein a small electric motor is used for the film winding and shutter charging operations, shutter release being controlled by means of a motor driven cam during a sequential halt in motor operation.

In accordance with the invention a small electric motor drives a cam and a mutilated gear; two cam follower levers being provided for the cam to control two sets of switches in the motor control circuit. A third set of switches is also provided in the motor circuit controlled by a cam operable by the camera shutter mechanism, or the mirror return mechanism of the camera. Motor braking circuits are completed over the switches during shutter release or terminal operation, the mutilated gear providing a dwell period during which the film winding and shutter charging mechanisms are disconnected from the motor drive.

The present invention will be described more in detail referring to the embodiments shown in the drawing, in which:

FIG. 2 is a partial cross section taken along the line II—II of FIG. 1;

FIGS. 3 to 7 are the diagrams showing the operations in continuous photographing.

Figure 1:
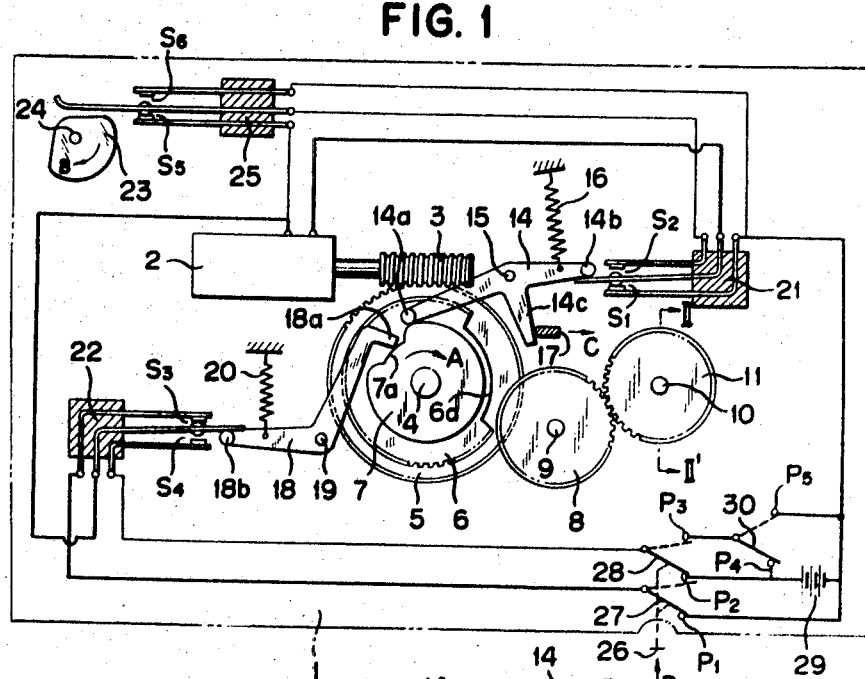
FIG. 1 is a diagram showing the main structure of an embodiment of the present invention, the selection switch being in its continuous operation position.

Referring now in detail to the drawings, the reference numeral 1 designates a camera body wherein a small electric motor 2 is secured for driving a worm gear 3. Rotatably mounted within the camera body 1 is a drive shaft 4 on which are secured a worm wheel 5 meshing with and driven by a worm gear 3, a driving gear 6 and a cam 7; operation of the motor 2 rotating the shaft 4 in a clockwise direction as indicated by the arrow A in FIG. 1. For purposes hereinafter appearing, gear 6 is formed with a cut-away portion or notch 6a and cam 7 is formed with a notch 7a.

Adapted to mesh with the teeth of the gear 6 is an intermediate gear 8 supported rotatably within the camera body 1 on a shaft 9. The intermediate gear in turn meshes with a winding gear 11 mounted on a rotatable shaft 10, the shaft 10 being a winding shaft forming a part of the film winding and shutter charging mechanisms of the camera, not otherwise illustrated. Referring to FIG. 2 of the drawings, the rotation of gear 11 by gear 8 is transmitted through a spring clutch provided by a clutch plate 13 secured to the shaft 10 and a spring plate 12 frictionally engaging the opposed faces of the gear 11 and plate 13.

Rotatably mounted in camera body 1 is a first lever 114, as on shaft 15; the lever being biased by a spring 16 in a counterclockwise direction so that a cam follower 14a on the end of one arm rides on the periphery of cam 7 while an insulated stud 14b on the end of the other lever arm engages first switch 21 to be more fully described hereinafter. The lever 14 further comprises a center or dependent arm 14c which is adapted to engage a shutter release member 17 of the camera shutter mechanism (not shown) movement of the member 17 to the right in FIG. 1 in the direction of arrow C releasing the shutter mechanism.

Rotatably mounted within the camera body 1 is a second lever 18 on a shaft 19, the second lever being biased in a clockwise direction by a spring 20. One end of lever 18 forms a cam follower 18a engaging the periphery of the cam 7, while the other end of the second lever is provided with an insulated stud 18b adapted to engage a second switch 22. A signal member in the form of a cam 23 is rotatably mounted within the camera body on a shaft 24, the shaft 24 being driven by the camera shutter mechanism (not shown) to rotate the cam member 23 in a clockwise direction indicated by the arrow B in FIG. 1. The signal or cam member cooperates with a third switch 25, the cam member being so disposed and contoured, that shortly before or after completion of the shutter operation, the cam will be rotated to open the normally closed contacts $S_5$ and close the normally open contacts $S_6$ of switch 25 as illustrated in FIG. 4. As will be readily understood by those skilled in the art, the cam 23 may be connected to be rotated upon the return of the mirror in a single lens reflex camera.

Extending out through the camera body 1 is an actuating rod 26 cooperating with operational switches 27 and 28 adapted to be selectively connected to a battery 29. Included in this group of operational switches is a selector switch 30 which may be positioned from outside the camera body and is used to select single frame operation of the mechanism or continuous operation of the mechanism upon depression of the actuating rod 26 to operate the motor 2 from the battery source 29.

Assuming the mechanism is to be operated for continuous frame operation of the camera, the selector switch 30 is in the position illustrated in FIG. 1 engaging the contact $P_4$. Depression of the actuating rod 26 will connect switch 27 with contact $P_2$ and switch 28 with contact $P_3$. The electrical circuit for motor 2 is completed from battery 29, over closed contacts $S_1$ of switch 21 to motor 2, over closed contacts $S_3$ of switch 22 and over switch 27, contact $P_2$ to battery, as shown in heavy line in FIG. 1. With the operation of motor 2, the worm wheel 5 is rotated to rotate the shaft 4, gear 6 and 7. As cam 7 starts to rotate in the direction indicated, cam follower 14a will drop into notch 7a to open contacts $S_1$ of switch 21 and close contacts $S_2$ as shown in FIG. 3. The motor circuit to battery supply 29 is opened and a motor braking circuit is closed over contacts $S_2$ of the first switch 21 over the $S_5$ of the third switch, as shown in heavy line in FIG. 3. The motor 2 is brought to a halt.

Figure 5:
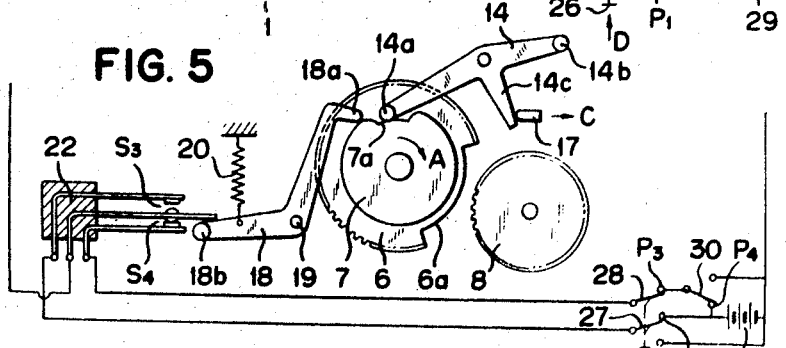

As cam follower 14a drops into the cam notch 7a, however, the arm 14c of the first lever moves the shutter release member 17 in the direction C to release the shutter. As previously described, the release of the shutter rotates cam 23 in the direction B to open the contacts $S_5$ and close contacts $S_6$ to close a circuit for the motor 2 over contacts $S_6$ and $S_2$ to one battery terminal and over closed contacts $S_3$ of the second switch and contact $P_2$ to the other battery terminal. Motor 2 thus rotates the cam 7 in the direction A until the cam follower 18a of the second lever rides up on the periphery of the cam 7 (FIG. 5) to open contacts $S_3$ and close contacts $S_4$. The motor circuit remains unbroken, the circuit being maintained over closed contact $S_4$ and contacts $P_3$ and $P_4$. With the continued rotation of cam 7, the cam follower 14a of the first lever rides up over the periphery of the cam as shown in FIG. 6 to permit return of the shutter release member 17 and to open contacts $S_2$ and close contacts $S_1$ of the first switch as shown in FIG. 1.

Figure 7:
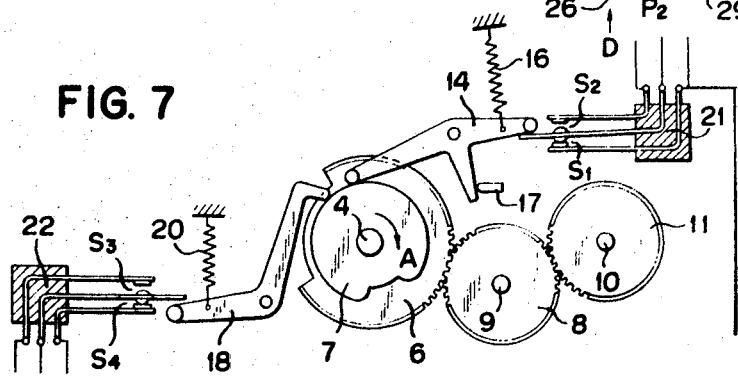

The operation of motor 2 and the rotation of shaft 4 thereby in the manner thus far described, does not effect the shutter winding mechanism or film advancement (not shown) of the camera, since the cut-away portion or notch 6a of the driving gear is opposite the intermediate gear 8 which is connected to the camera mechanism. At the time that the trigger release member 17 returns to its home position when cam follower 14a rides up onto the periphery of cam 7, the teeth of intermediate gear 8 will mesh with the teeth of the driving gear 6 to advance the film advance mechanism and charge the shutter mechanism through spring clutch 12, 13; any excess rotation by gear 8 being taken up in this clutch provided, as shown in FIG. 7.

The charging of the camera shutter mechanism will also rotate the cam 23 in the direction B to return the cam from the position illustrated in FIG. 4 to the home position, illustrated in FIG. 1. The closing of contacts $S_5$ and opening contacts $S_6$ will not effect the motor circuit during this operation.

Upon continuing rotation of the cam 7 by the motor 2, both cam followers 14a and 18a will ride on the periphery of the cam until the cam follower 18a drops into notch 7a as illustrated in FIG. 1, to close contacts $S_3$ and open contacts $S_4$ of the second switch. With the closure of contacts $S_3$ the operation of the motor 2 is again initiated so that a continuous operation of the camera is achieved, one exposure being made after another with the film being advanced and the shutter mechanism charged between each exposure. The operation of the motor 2 is continuous until the actuating rod 26 is released to open contacts $P_2$ and $P_3$ and close contacts $P_1$ and $P_2$ as shown in FIG. 1. It should be noted that the motor 2 will continue to operate until cam follower 18a falls into notch 7a of the cam, the motor circuit being maintained over closed contacts $S_4$. When contacts $S_4$ open as cam follower 18a enters the notch 7a the motor circuit to battery supply is open and a braking circuit is completed over contacts $S_1$ of the first switch 21, over contacts $P_1$ and $S_3$ of the second switch 22, as shown in heavy line in FIG. 1, the motor 2 being shorted and acting as a generator to provide dynamic braking, the energy being dissipated in the circuit leads.

Figure 8:
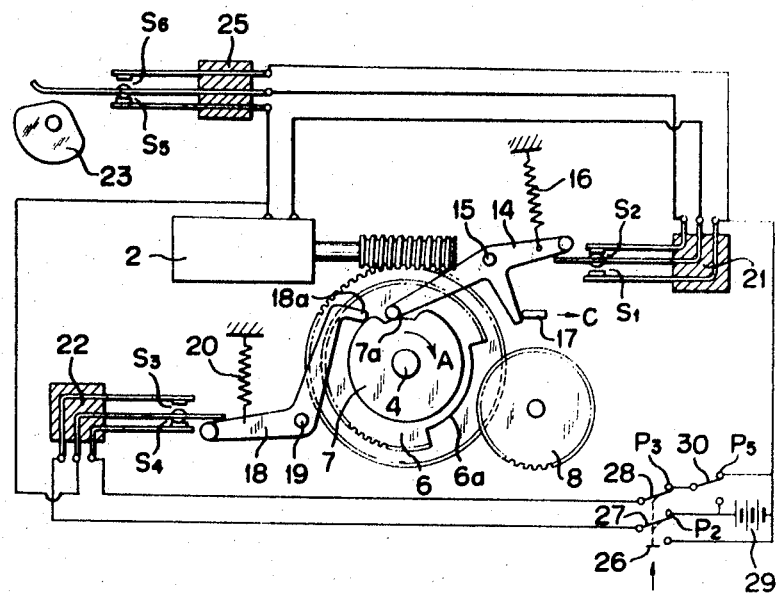
FIGS. 8 and 9 are the diagrams showing the operation in one frame photographing.
Figure 9:
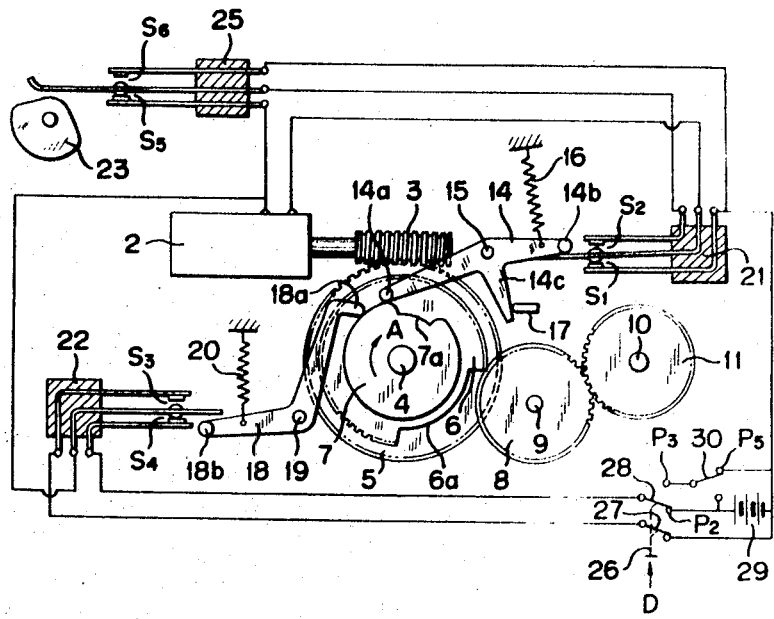

If it is desired to make single exposures with the circuit as herein described, the switch 30 is connected to the contact $P_5$ and the operating rod 26 depressed. Closure of the switches 27 and 28 with the contacts $P_2$ and $P_3$ respectively, will close the circuit for motor 2 as previously described. Referring in particular to FIG. 8 of the drawings, the operational sequence previously described has been completed to the point where cam follower 18a rides up onto the cam periphery to open contacts $S_3$ and close contacts $S_4$. The circuit for the motor 2 is opened and a braking circuit is established as shown by the heavy lines. Even though the operating rod 26 is held depressed, the motor circuit remains open until the rod 26 is released. Upon release of the rod 26, switch 27 will engage contact $P_1$ and switch 28 will engage contact $P_2$ (FIG. 9) to complete the motor circuit. The motor continues operating until the cam 7 is returned to its initial position, the braking circuit for the motor being established as the cam follower 18a drops into the notch 7a of the cam. It will be noted that even if the operating rod 26 is inadvertently depressed during the rewind and recharge cycle of the motor 2, the motor circuit will be opened and the cycle interrupted. When this device is applied to a single lens reflex camera, said signal member 23 can be interlocked to the operation of the reflecting mirror.

As mentioned above, in accordance with the present invention, when the motor is stopped, it is stopped by making the circuit of said motor into a braking circuit, and therefore even if the motor is rotated at high speed, there is almost no danger that the sequence is broken by the rotational inertia.

The instant the movement of the signal member 28 is initiated or its instant of switch actuation, and the time of meshing the mutilated gear 6 and the intermediate 8 may be appropriately selected to reduce the overall time of operation which in no way will effect or interfere with the other camera mechanisms. In fact, the signal member and other mechanisms are connected electrically and therefore it is possible to freely select the positions of the motor, the cam, the intermittent transmitting means and the levers without being affected by the position of the shutter means of the camera. There is an advantage that the device itself can be made small in a compact form. It is needless to mention here that the present invention may not only be built in a camera, but may also be provided as an accessory to be attached to a camera.

What is claimed is:

1. An automatic winding means for electrically driven cameras wherein film winding, shutter charging and shutter releasing operations are controlled by the rotation of cams and an intermittent transmitting means driven by a motor, the combination comprising
    a cam driven by the motor,
    a first lever cooperating with said cam and movable thereby just before an exposure is made,
    a member on said first lever cooperating with a shutter release member of the camera to release the camera shutter when said first lever is moved,
    a signal member moving in conjunction with the shutter mechanism near the termination of the shutter operation,
    a second lever movable by said cam at the completion of the film and shutter winding operations, an electrical circuit including a power supply for the motor, a first double contact switch engageable by the first lever, a second double contact switch engageable by the signal member, a first motor braking circuit in parallel with the motor through the second and first contact switches and opened at the termination of the shutter operation by the signal member, a second motor braking circuit in parallel with the motor circuit, and a third double contact switch engageable by the first lever in the second braking circuit, the first switch being selectively connected to the first braking circuit when the shutter releasing member is actuated, and then to the second motor braking circuit just before said first motor braking circuit is opened by said second double contact switch, one contact of said each switch being connected to said braking circuit, the other contact of said each switch being connected to the motor circuit, to open the motor circuit when a motor braking circuit is completed.

References Cited
UNITED STATES PATENTS

| | | |
|---|---|---|
| 3,007,385 | 10/1961 | Fukuoka. |
| 3,064,522 | 10/1962 | Fukuoka. |
| 3,138,080 | 6/1964 | Jacobson. |
| 3,171,338 | 3/1965 | Winkler et al. |

U.S. Cl. X.R.

NORTON ANSHER, Primary Examiner

DAVID S. STALLARD, Assistant Examiner